United States Patent [19]
Younessi et al.

[11] Patent Number: 5,123,246
[45] Date of Patent: Jun. 23, 1992

[54] CONTINUOUSLY PROPORTIONAL VARIABLE GEOMETRY TURBOCHARGER SYSTEM AND METHOD OF CONTROL

[75] Inventors: Ramin Younessi; Guy T. Rini, both of Hagerstown, Md.

[73] Assignee: Mack Trucks, Inc., Allentown, Pa.

[21] Appl. No.: 645,844

[22] Filed: Jan. 25, 1991

[51] Int. Cl.⁵ ............................................. F02B 37/12
[52] U.S. Cl. ........................................................ 60/602
[58] Field of Search .................. 60/600, 601, 602, 603

[56] References Cited

U.S. PATENT DOCUMENTS

| | | | |
|---|---|---|---|
| 4,660,382 | 4/1987 | Ueno et al. | 60/602 |
| 4,671,068 | 6/1987 | Moody et al. | 60/602 |
| 4,741,163 | 5/1988 | Hidaka et al. | 60/602 |
| 4,756,161 | 7/1988 | Hirabayashi | 60/602 |
| 4,769,994 | 9/1988 | Hirabayashi | 60/602 |
| 4,848,086 | 7/1989 | Inoue et al. | 60/602 |

Primary Examiner—Michael Koczo
Attorney, Agent, or Firm—Rothwell, Figg, Ernst & Kurz

[57] ABSTRACT

A system and method for closed loop control of a pressure-activated variable geometry turbocharger (VGT) for use in internal combustion engines, such as heavy duty diesel engines, provides sensors for detecting both intake manifold boost pressure as well as VGT actuator pressure. Sensors are also provided for detecting various engine operating parameters. Target VGT actuator pressures and target intake boost pressures are read from look-up tables according to the engine operating parameter values. Closed loop control of VGT geometry is effected based upon either VGT actuator pressure error or intake manifold boost pressure error as a function of engine operating mode, e.g., steady state or transient state operation. Turbine overspeed protection and adaptive compensation for transient state control are also performed.

12 Claims, 4 Drawing Sheets

CONTINUOUSLY PROPORTIONAL VARIABLE GEOMETRY TURBOCHARGER SYSTEM AND METHOD OF CONTROL

BACKGROUND OF THE INVENTION

1. Field of the Invention

The present invention relates generally to variable geometry turbine control systems, and more particularly to variable geometry turbocharger (VGT) systems and control thereof for use in internal combustion engines, and especially heavy duty diesel engines.

2. Background and Prior Art

Turbochargers are conventionally used in internal combustion engines to increase the amount of injected intake air so as to increase the output of the engine. In general, the turbocharger consists of a turbine wheel mounted in the exhaust manifold of the engine and a compressor coupled to the turbine wheel and mounted in the intake manifold of the engine. As exhaust gases flow past the turbine wheel it is rotated, causing the compressor to also rotate which increases the pressure of the intake air being charged into the engine cylinders, mixing with fuel and thereafter undergoing combustion.

A known objective with turbocharger design is the attainment of efficient operation over the entire rpm range of the engine. For example, if a turbocharger is designed to provide maximum torque at low engine speeds, at high engine speeds the turbine wheel will rotate at an excessive speed, eventually causing damage by supplying too much air to the engine, and causing excessive wear of the turbocharger parts. On the other hand, if a turbocharger is provided to operate most efficiently at high engine speeds, the efficiency of the turbocharger will be undesirably low when the engine is running at low speeds.

Variable geometry turbochargers or VGTs are usually provided with control of the configuration of the turbine scroll or throat to vary the velocity of exhaust gases flowing past the turbine wheel, or control of the turbine vane angle to vary the amount of exhaust gases "caught" by the turbine. Thus, by suitably changing the turbine configuration according to the engine operating state, more efficient turbocharger operation can be realized over a wider rpm range.

Various control regimes for VGTs are known in the art. See, U.S. Pat. Nos. 4,756,161, 4,769,994, 4,660,382, and 4,741,163. Such systems typically adjust VGT geometry based on engine speed or engine load (fuel quantity), or on supercharging pressure.

However, there remains a need for improvement in optimizing control of VGT configurations taking into account engine operational states, to achieve even higher efficiencies of operation.

SUMMARY OF THE INVENTION

The present invention provides a continuously proportional VGT system and method of control which achieves superior performance characteristics over prior VGT control systems, resulting in greater fuel economy, improved vehicle acceleration, and increased exhaust emission control.

The continuously proportional VGT system and control method of the present invention optimizes the geometry of the turbocharger turbine based on several engine operating parameters which are measured by sensors. The present invention provides a system in which the operational state of the engine is determined from outputs of the sensors, and closed loop control of the VGT geometry is performed based on a specific error correction value as a function of whether the engine is in a steady state or transient state mode of operation.

The continuously proportional VGT system of the present invention also provides for an improved method of turbine overspeed control, which eliminates the need for barometric pressure sensors conventionally used for this purpose.

The continuously proportional VGT system of the present invention further provides for "learned" compensation of error correction values during actual closed loop control of VGT geometry, thus taking into account variations and changes in characteristics among the various physical components of the VGT system over its operational life, as well as variations occurring as a result of specific operating environment conditions.

The present invention is realized by providing a system for performing closed loop control of a variable geometry turbocharger (VGT) utilized in an internal combustion engine, comprising VGT actuator means for changing the geometric configuration of the VGT in response to an actuator control signal sensor means for detecting selected engine operating parameters including a VGT actuator parameter and an engine intake manifold parameter, and generating output signals representative thereof means for outputting a target VGT actuator parameter value and a target intake manifold parameter value based on the values of selected sensor means output signals means for determining whether the engine is in a steady state or a transient state of operation based on the values of selected sensor means output signals, and means for developing an actuator control signal based on one of said target parameter values as a function of the determined engine operating state.

The present invention also provides a closed loop method for continuously controlling a variable geometry turbocharger (VGT) utilized in an internal combustion engine, comprising the steps of detecting selected engine operating parameters including a VGT actuator parameter and an engine intake manifold parameter and generating output signals representative thereof, outputting a target VGT actuator parameter value and a target intake manifold parameter value based on the values of selected sensor means output signals, determining whether the engine is in a steady state or a transient state of operation based on the values of selected sensor means output signals, developing an actuator control signal based on one of the target parameter values as a function of the determined engine operating state, and changing the geometric configuration of said VGT in response to the actuator control signal.

BRIEF DESCRIPTION OF THE DRAWINGS

The present invention will become more fully understood from the detailed description given herein below and the accompanying drawings which are given by way of illustration only, and are not limitative of the present invention, and wherein.

DETAILED DESCRIPTION OF THE PREFERRED EMBODIMENTS

The present invention will now be described in detail with reference to the drawings.

Figure 1:
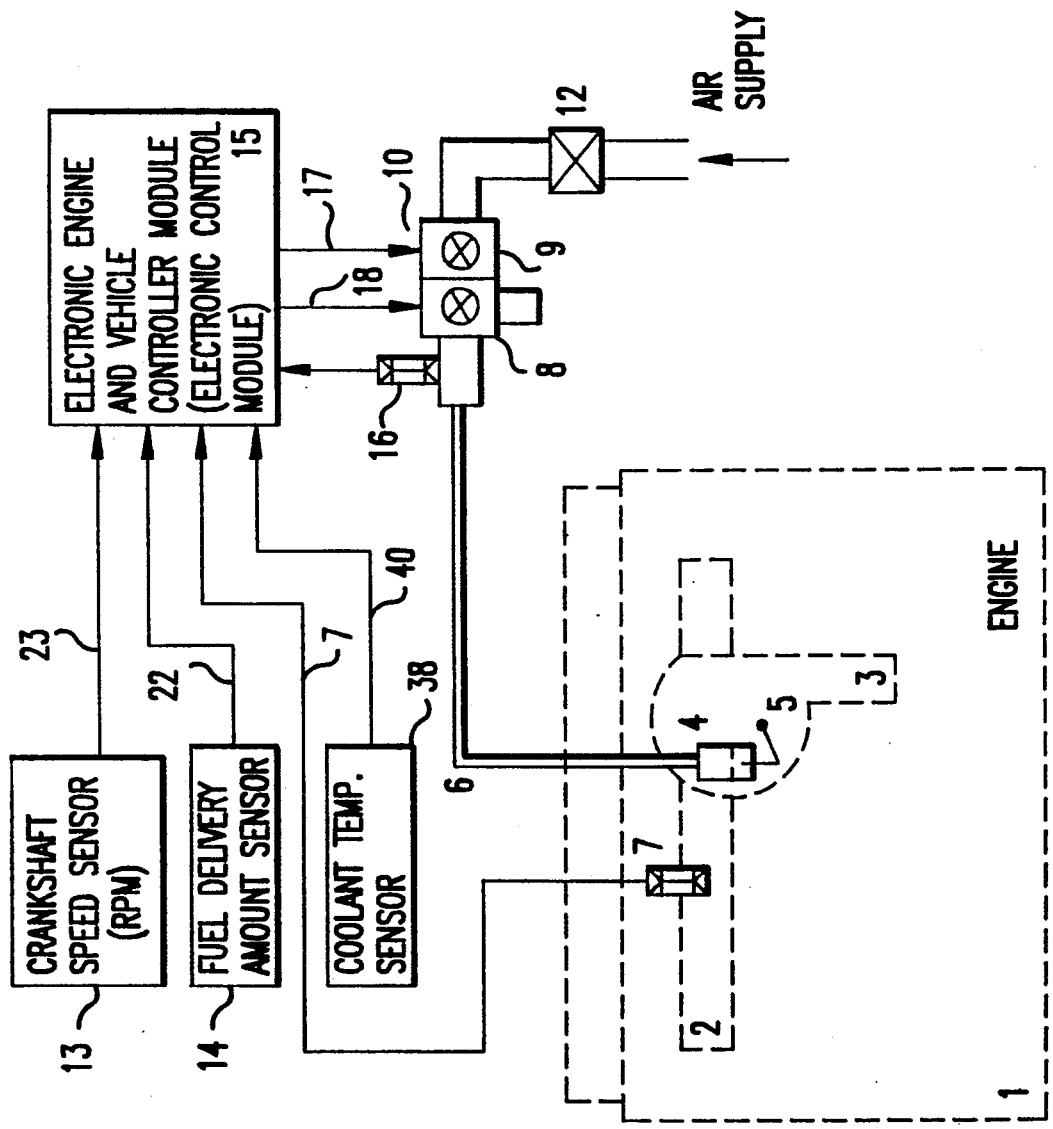
FIG. 1 is a block diagram illustrating one preferred embodiment of a continuously proportional VGT system according to the present invention.

Referring to FIG. 1, a variable geometry turbocharger 3 is mounted on the exhaust manifold (not shown) of an internal combustion engine 1, which may be a heavy duty diesel engine, gasoline engine, or any other equivalent type of engine.

A VGT actuator 4 is mounted on the turbocharger 3 and includes a pressure-activated piston which is mechanically linked to a VGT arm 5 located within turbocharger 3. Modulated air pressure is supplied to actuator 4 through supply line 6, and pneumatically controls the position of the piston, which in turn moves the VGT arm 5 to change the geometric configuration of the turbocharger.

The air pressure in supply line 6 is controlled by actuator controller 10 which includes a pair of solenoid valves 8 and 9. An air supply is provided at an inlet port of the actuator controller 10, and the maximum allowable air pressure is regulated by an air pressure regulator or governor 12. The maximum pressure setting may be varied in the governor 12 according to the specific type of VGT actuator and solenoid valves employed in the system.

The VGT actuator pressure is monitored by actuator pressure sensor 16 mounted on controller 10, which inputs a signal representative of the actuator pressure to electronic control module 15. The control module 15 may be configured to provide control functions for the entire vehicle including engine operation, performance and safety features, as well as diagnostics, or may be configured to solely control the operation of the VGT.

The pressure in the actuator 4 is controlled by the control module 15 through operation of the solenoid valves 8 and 9. Increased air pressure is obtained by controlling the on-time of supply solenoid valve 9 with a control signal on line 17, and air pressure in the actuator 4 is decreased by controlling the on-time of exhaust solenoid valve 8 with a control signal on line 18. The control signals on lines 17 and 18 may be pulse width modulation (PWM) signals, for example, the width or duty cycle of which determines the on-times for the solenoid valves 8 and 9.

It is to be noted that although the described embodiment utilizes air pressure to control the actuator piston, in certain applications engine oil pressure may be used in place of air pressure. Similarly, the solenoid valves 8 and 9 may be replaced by any suitable equivalents such as linear actuators for controlling flow of fluid pressure.

Intake manifold boost pressure is detected by pressure sensor 7 which is mounted in the engine intake manifold 2 and provides an input signal representative of the intake manifold boost pressure to the control module 15.

A crankshaft speed sensor 13 is mounted adjacent the engine crankshaft and inputs a signal on line 23 indicative of the engine speed in rpm to the control module 15. A fuel delivery amount sensor 14 inputs a signal on line 22 which represents the amount of fuel delivered to the engine, which is indicative of engine load. Sensor 14 can be mounted, for example, proximate the fuel rack of the fuel injection pump to detect the position of the rack and therefore the amount of fuel being injected into the engine. Engine coolant temperature is detected by temperature sensor 38 which provides an input signal 40 representative of the engine coolant temperature to the control module 15.

Figure 2:
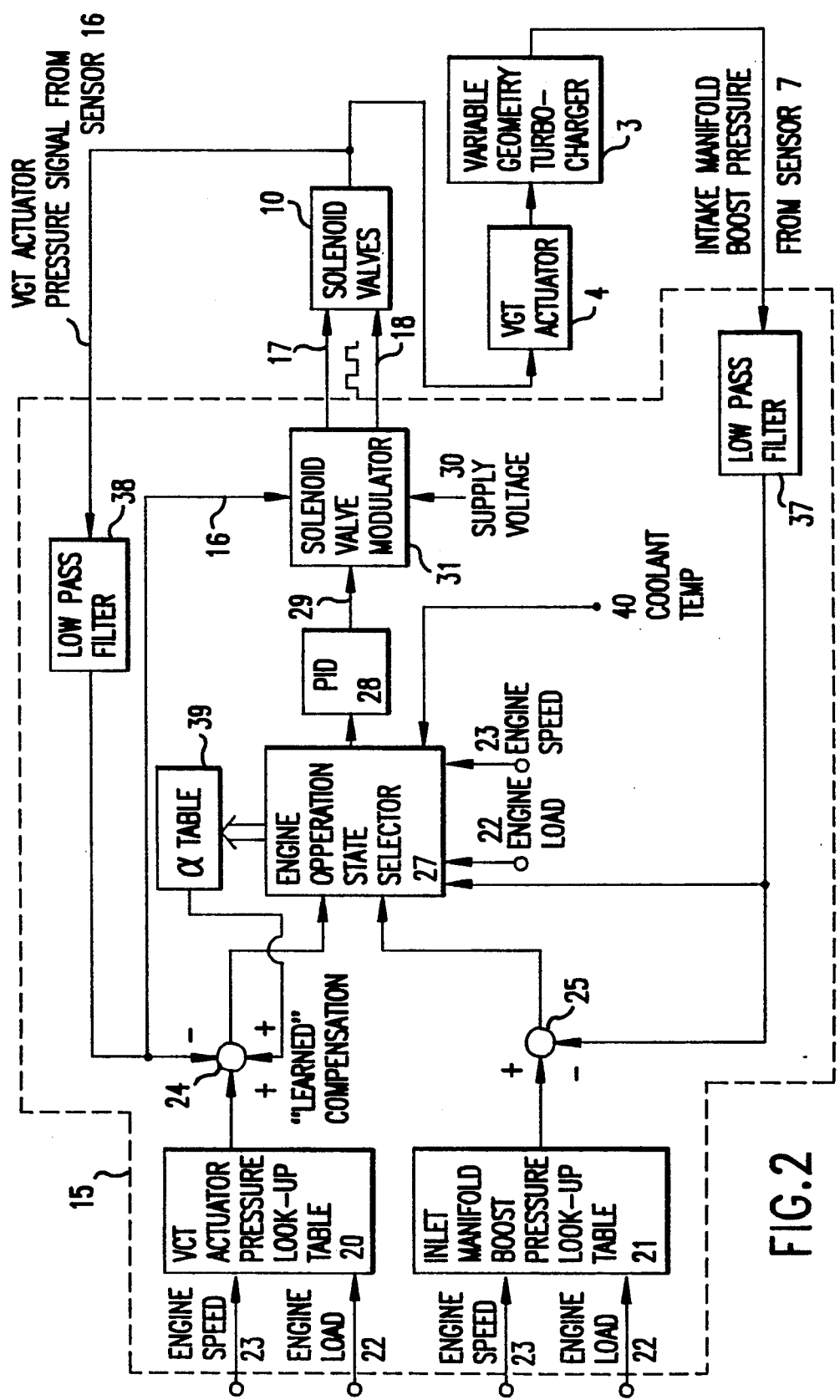
FIG. 2 is a component block diagram illustrating details of the electronic control module 15 of FIG. 1.

Referring to FIG. 2, the closed loop control of the present invention determines the optimal turbocharger geometry according to the engine's operating state based on selected engine operating parameters. Optimal VGT geometry is directly related to intake manifold boost pressure and VGT actuator pressure. In the present embodiment, optimal or "target" intake manifold boost pressures and VGT actuator pressures are predetermined in advance over the entire operating range of particular engine and VGT types, and are stored in a pair of look-up tables 20 and 21 as a function of engine speed and engine load.

These target values are read out of the look-up tables in response to the engine speed signal on line 23 and the engine load signal on line 22 applied at input terminals of the look-up tables, and are compared with the actual VGT actuator pressure and intake manifold boost pressure values from sensors 16 and 7 respectively, in first and second arithmetic circuits 24 and 25, which operate on the inputted values to generate a VGT actuator pressure differential signal $\Delta_{AP}$=[target VGT actuator pressure—actual VGT actuator pressure] and an intake manifold boost pressure differential signal $\Delta_{BP}$=[target intake manifold boost pressure—actual intake manifold boost pressure]. The actual VGT and intake boost pressure signals are provided through low pass filters 36 and 37 to eliminate noise from other parts of the engine from interfering with the signals.

Engine operation state selector 27, which can be a microprocessor-based circuit for example, determines the operational mode of the engine based on threshold values of any one or any combination of a number of engine operating parameters such as engine load, engine speed, coolant temperature, intake boost pressure, rate of change of engine load, rate of change of engine speed, or rate of change of intake boost pressure. For example, the coolant temperature may be detected by a sensor 38 mounted in the cooling system.

Based on the determined operating state of the engine, closed loop control will be performed using either $\Delta_{AP}$ or $\Delta_{BP}$. In the preferred embodiment, control of VGT geometry is performed based on $\Delta_{BP}$ when the engine is in a steady state, and is based on $\Delta_{AP}$ when the engine is in a transient state.

The appropriate differential signal is inputted to PID (proportional-integral-differential) controller 28 from state selector 27. PID controller 28 performs a PID operation on the differential signal to produce a time command signal on line 29, which in the preferred embodiment is a PWM signal for controlling the on-time of solenoid valves 8 and 9. Specifically, either the supply valve 9 or the exhaust valve 8 will be controlled dependent upon whether the differential signal is positive or negative (indicating whether the actual pressure is lower or higher than the target pressure).

Figure 4A:
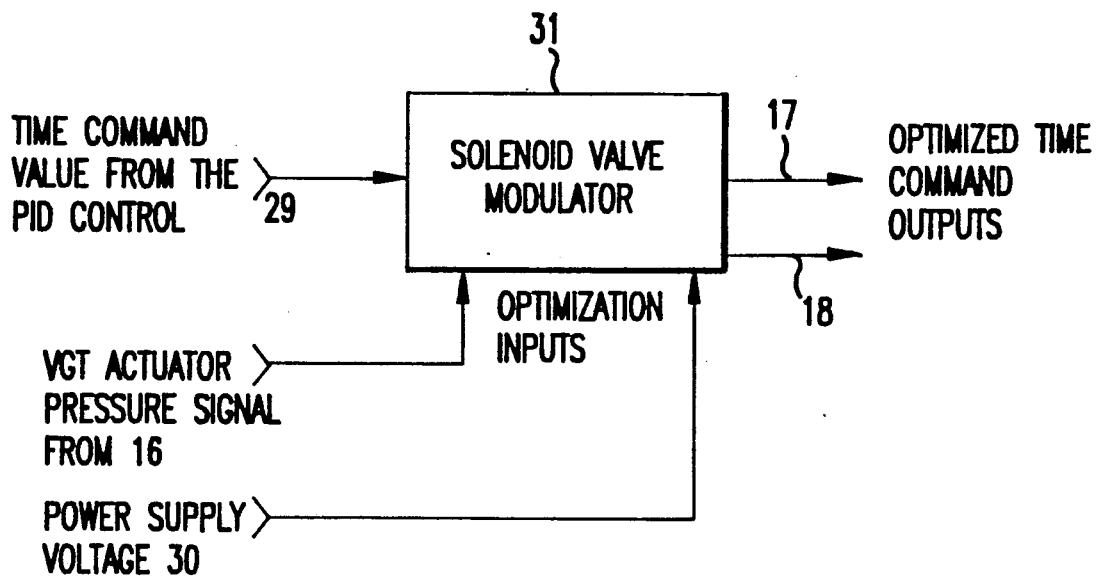
FIG. 4A is a block diagram for explaining the operation of the solenoid valve modulator 31 of FIG. 2.
Figure 4B:
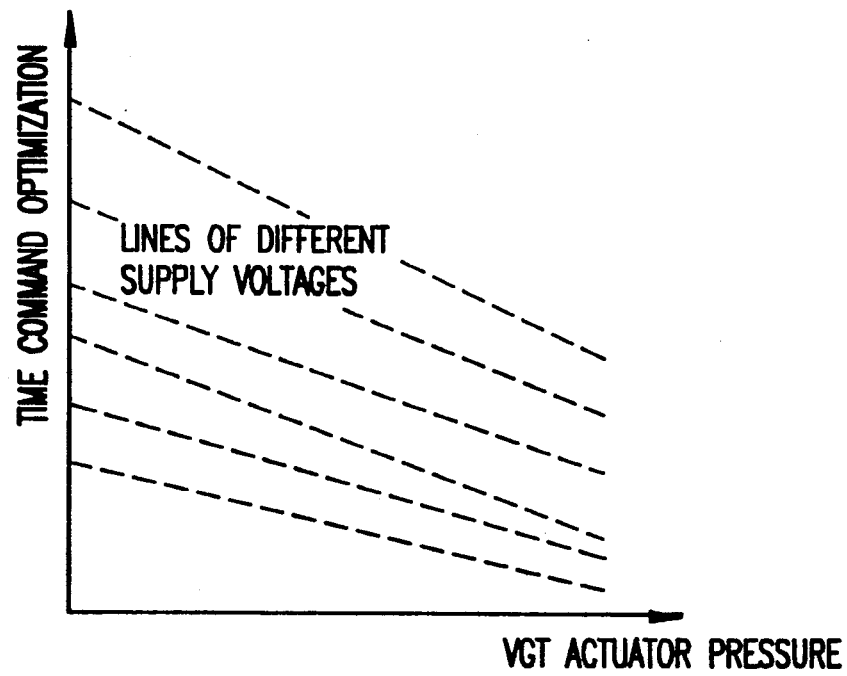
FIG. 4B is a graph illustrating the supply voltage characteristics taken into account by the solenoid valve modulator 31 in calculating an optimum time command value for VGT control.

The solenoid valve response to the PWM time command control signals is subject to variation as a function of power supply voltage and the pressure of the VGT actuator. An example of such characteristics is illustrated in the graph of FIG. 4B. The power supply voltage may vary as a result of changes in the battery charging system, the power supply condition, and the like. In order to compensate such solenoid valve response, solenoid valve modulator 31 receives as input signals the PWM time command control signal 29 from PID controller 28, the VGT actuator pressure from sensor 16, and a power supply voltage signal on line 30, as shown in FIGS. 2 and 4A. Solenoid valve modulator 31 may also be constituted by a microprocessor. The solenoid valve modulator 31 alters the time command control signal 29 from PID controller 28 in accordance with the characteristic curves of FIG. 4B to produce optimized PWM control signals on lines 17 and 18 which are inputted to the actuator controller 10 incorporating solenoid valves 8 and 9.

Figure 3:
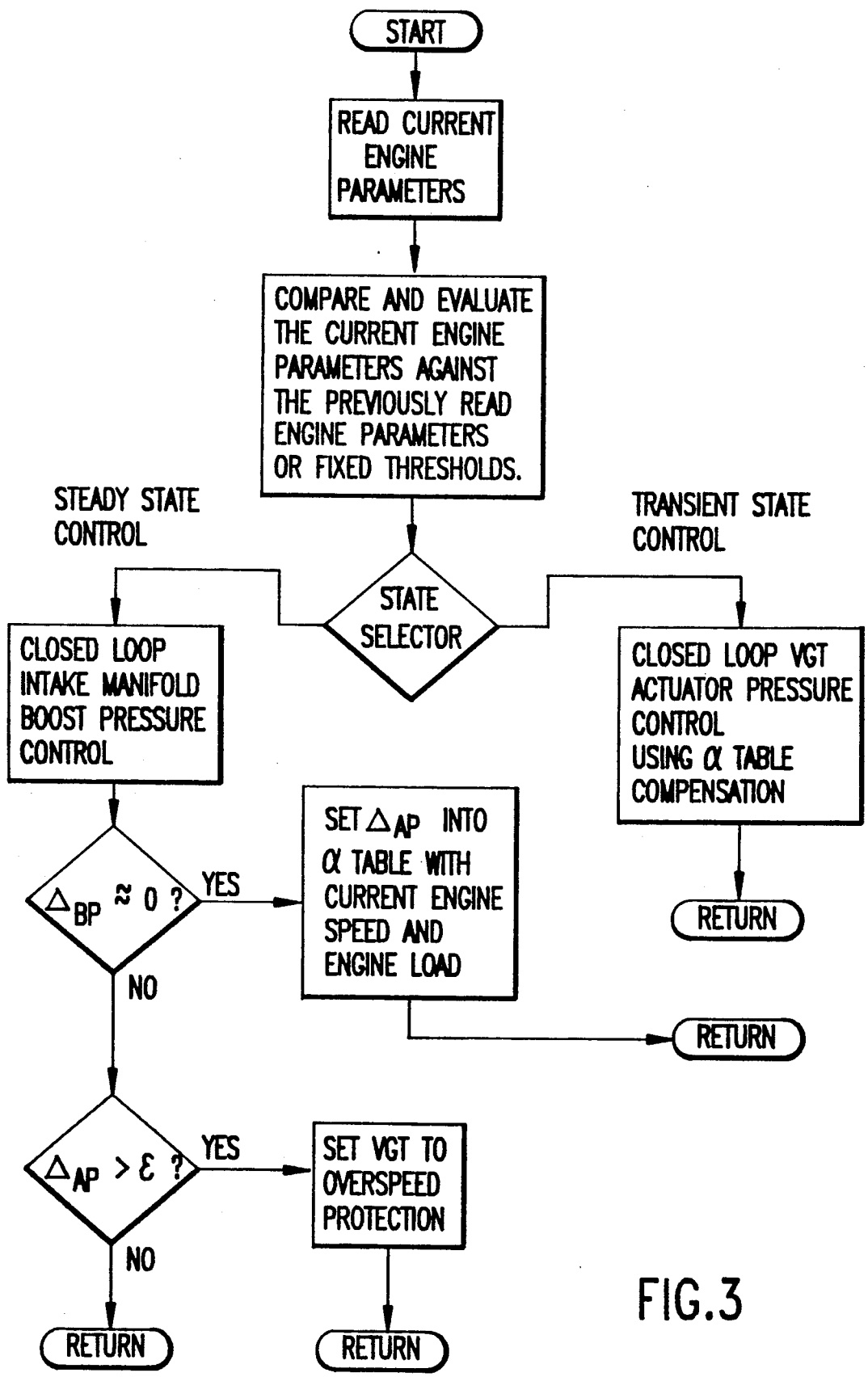
FIG. 3 is a flow chart illustrating a preferred embodiment of the operation of the electronic control module 15.

Operation of the electronic control module 15 is explained by the flow chart of FIG. 3. At the start of every loop, engine parameters are read and stored by the engine operation state selector 27. The selector then compares the current engine parameter values with the engine parameter values read and stored in the previous loop or with fixed thresholds. Based on the results, the engine is determined to be in either the steady state or a transient state, and the appropriate differential signal is sent to PID controller 28 for generation of an appropriate time command control signal.

In variable geometry turbochargers, it is possible to overspeed and thus damage the turbine when optimal intake boost pressure is not reached, such as at high altitudes where ambient pressure is relatively low. In order to achieve high altitude overspeed protection, barometric pressure sensors have been conventionally used. The present invention eliminates the need for such a sensor by providing overspeed protection computational functions in the state selector 27. Overspeed protection is performed during the steady state control mode as the error in intake boost pressure approaches but is not at zero. Under such conditions, the VGT actuator differential signal $\Delta_{AP}$, representing the error in VGT actuator pressure, is compared with a maximum negative error $\epsilon$. If $\Delta_{AP}$ is greater than $\epsilon$, this indicates that the turbine may be rotating at an excessive velocity, and an appropriate response is made, such as setting the VGT to a maximum safe speed configuration. If $\Delta_{AP}$ is less than $\epsilon$, the control module operation will continue to cycle through the closed loop.

Another important function of the control system of the present invention is the ability to "learn" additional compensation values for the optimal VGT actuator pressure to further optimize transient state control.

Since the object of control is to reach optimal intake boost pressure under engine steady state operation, optimization of VGT actuator pressure under transient state control to correspond to optimal intake boost pressure under steady state control will compensate for variations among different solenoids, turbochargers, mechanical linkages, and the effects of wear on system components over time.

Thus, the learned compensation values are determined under steady state control when the target intake manifold boost pressure has been reached, in other words, $\Delta_{BP}=0$. In such case, the error value $\Delta_{AP}$ at such time as read by state selector 27 is mapped into an $\alpha$-table 39 in conjunction with the current engine speed and engine load. The $\alpha$-table 39 may be constituted by an EEPROM, a RAM, or other suitable semiconductor memory matrix. During transient state control, the learned compensation values in $\alpha$-table 39 may be added to $\Delta_{AP}$ in order to further optimize the target VGT actuator pressure.

The invention having been thus described, it will be obvious to those skilled in the art that the same may be varied in many ways without departing from the spirit of the invention. Any and all such modifications are intended to be included within the scope of the following claims.

What is claimed is:

1. A system for performing closed loop control of a variable geometry turbocharger (VGT) utilized in an internal combustion engine, comprising:

VGT actuator means for changing the geometric configuration of said VGT in response to an actuator control signal;

sensor means for detecting selected engine operating parameters including a VGT actuator parameter and an engine intake manifold parameter, and generating output signals representative thereof;

means for outputting a target VGT actuator parameter value and a target intake manifold parameter value based on the values of selected sensor means output signals;

means for determining whether said engine is in a steady state or a transient state of operation based on the values of selected sensor means output signals; and means for developing an actuator control signal based on one of said target parameter values as a function of the determined engine operating state.

2. A system for performing closed loop control of a variable geometry turbocharger according to claim 1, wherein, in addition to said VGT actuator and intake manifold parameters, said engine operating parameters are selected from the group consisting of engine load or fuel delivery amount, engine speed, engine coolant temperature, intake manifold temperature, and engine throttle position.

3. A system for performing closed loop control of a variable geometry turbocharger according to claim 2, wherein said VGT actuator parameter is pressure, said intake manifold parameter is air pressure, and said VGT actuator means comprises a pressure-controlled piston for changing the position of a VGT arm of said VGT which varies the velocity of exhaust gases flowing past a turbine of said VGT, and pressure control means responsive to said actuator control signal for varying the pressure applied to said piston.

4. A system for performing closed loop control of a variable geometry turbocharger according to claim 3, wherein said pressure control means comprises at least one solenoid valve, and said VGT actuator pressure is air pressure.

5. A system for performing closed loop control of a variable geometry turbocharger according to claim 4, wherein said pressure control means comprises a supply solenoid valve for increasing air pressure applied to said piston and an exhaust solenoid valve for decreasing air pressure applied to said piston.

6. A system for performing closed loop control of a variable geometry turbocharger according to claim 5, wherein said actuator control signal is a pulse width modulation (PWM) signal.

7. A system for performing closed loop control of a variable geometry turbocharger according to claim 6, further comprising:
  VGT actuator differential means for producing a differential signal equal to the difference between said target VGT actuator pressure signal and said sensor output VGT actuator pressure signal; and
  intake manifold pressure differential means for producing a differential signal equal to the difference between said target intake manifold pressure signal and said sensor output intake manifold pressure signal;
  said means for developing an actuator control signal comprising a proportional-integral-derivative (PID) controller which produces a PWM signal as a function of one of said differential signals produced by said VGT actuator differential means and said intake manifold pressure differential means, in accordance with the determined engine operating state.

8. A system for performing closed loop control of a variable geometry turbocharger according to claim 7, wherein said means for developing an actuator control signal further comprises means for optimizing said PWM signal from said PID controller as a function of power supply voltage and sensed VGT actuator pressure.

9. A system for performing closed loop control of a variable geometry turbocharger according to claim 7, wherein said PID controller uses said intake manifold pressure differential signal to produce said PWM signal when said engine is determined to be operating in a steady state, and said PID controller uses said VGT actuator pressure differential signal to produce said PWM signal when said engine is determined to be operating in a transient state, said system further comprising:
  means for storing said VGT actuator pressure differential signal as a function of engine speed and engine load sensor output signals during steady state control of said VGT, upon said intake manifold pressure differential signal substantially reaching zero; and
  means for adding said stored VGT actuator pressure differential signal to the VGT actuator pressure differential signal produced by said VGT actuator differential means during transient state control of said VGT.

10. A system for performing closed loop control of a variable geometry turbocharger according to claim 7, wherein said PID controller uses said intake manifold pressure differential signal to produce said PWM signal when said engine is determined to be operating in a steady state, and said PID controller uses said VGT actuator pressure differential signal to produce said PWM signal when said engine is determined to be operating in a transient state, said system further comprising:
  means for comparing said VGT actuator pressure differential signal to a predetermined maximum error value during steady state control of said VGT when said intake manifold pressure differential signal is other than zero; and
  means for preventing said PID controller from producing a PWM signal exceeding a predetermined maximum turbine velocity to prevent damage to the turbine.

11. A system for performing closed loop control of a variable geometry turbocharger according to claim 3, wherein said means for outputting a target VGT actuator parameter value and a target intake manifold parameter value comprises at least one look-up table memory.

12. A closed loop method for continuously controlling a variable geometry turbocharger (VGT) utilized in an internal combustion engine, comprising the steps of:
  detecting selected engine operating parameters including a VGT actuator parameter and an engine intake manifold parameter, and generating output signals representative thereof;
  outputting a target VGT actuator parameter value and a target intake manifold parameter value based on the values of selected sensor means output signals;
  determining whether said engine is in a steady state or a transient state of operation based on the values of selected sensor means output signals;
  developing an actuator control signal based on one of said target parameter values as a function of the determined engine operating state; and
  changing the geometric configuration of said VGT in response to said actuator control signal.

* * * * *